United States Patent

Heitman et al.

[11] Patent Number: 5,071,059
[45] Date of Patent: Dec. 10, 1991

[54] METHOD FOR JOINING SINGLE CRYSTAL TURBINE BLADE HALVES

[75] Inventors: Peter W. Heitman, Indianapolis; Stephen N. Hammond, Brownsburg; Lawrence E. Brown, Indianapolis, all of Ind.

[73] Assignee: General Motors Corporation, Detroit, Mich.

[21] Appl. No.: 666,977

[22] Filed: Mar. 11, 1991

[51] Int. Cl.⁵ .................. B21K 3/04; B23P 15/04; B23P 31/00
[52] U.S. Cl. .................. 228/244; 228/225; 228/263.13; 29/889.72; 219/76.13
[58] Field of Search ............ 29/889.72, 889.61, 889.7, 29/889, 889.21; 228/253, 254, 263.13, 208, 225, 244, 28, 226, 175; 219/76.13, 85.1, 85.22; 427/383.7, 383.9

[56] References Cited

U.S. PATENT DOCUMENTS

| | | | |
|---|---|---|---|
| 2,166,998 | 7/1939 | Morgan | 29/889.21 |
| 2,463,340 | 3/1949 | Wieberg | 29/889.21 |
| 3,088,192 | 5/1963 | Turner | 228/263.13 |
| 4,551,603 | 11/1985 | Rocklin | 219/76.13 |
| 4,611,752 | 9/1986 | Jahnke | 228/234 |
| 4,649,089 | 3/1987 | Johnson | 428/627 |

FOREIGN PATENT DOCUMENTS 55-1920 1/1980 Japan .................. 228/263.13

Primary Examiner—Richard K. Seidel
Assistant Examiner—Jeanne M. Elpel
Attorney, Agent, or Firm—George A. Grove

[57] ABSTRACT

Single crystal, nickel based superalloy turbine blades are formed by fusion welding together two matched blade halves. The matched blade halves are joined by an electrospark deposition process which deposits a weld filler metal along the matched faying surfaces. The deposited weld filler metal is preferably the same nickel based superalloy used to form the single crystal turbine blades. Total heat input to the base metal is minimal so that distortion and metallurgical structure changes of the base metal are virtually nonexistent.

6 Claims, 1 Drawing Sheet

U.S. Patent     Dec. 10, 1991     5,071,059
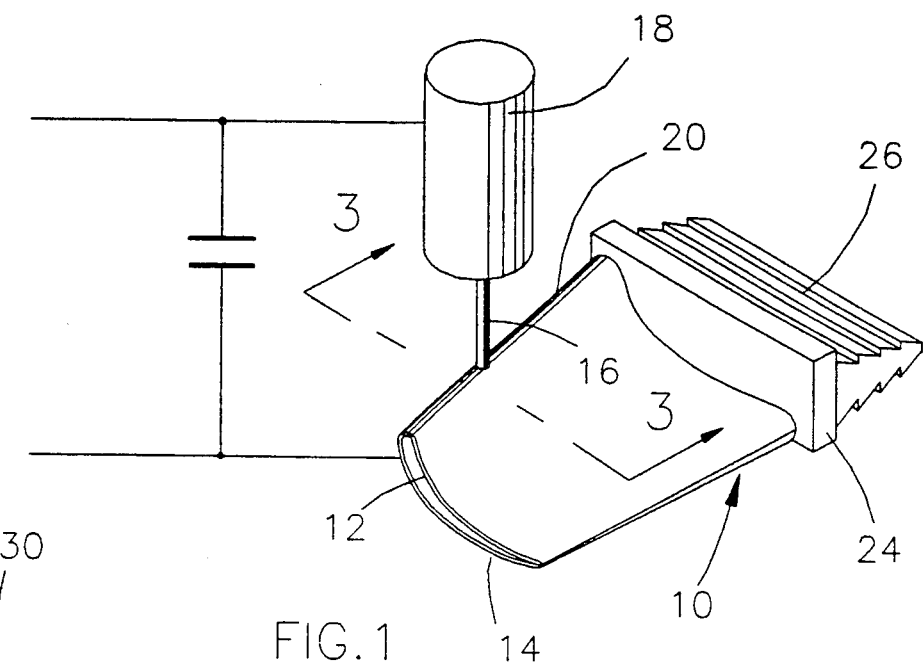
FIG. 1
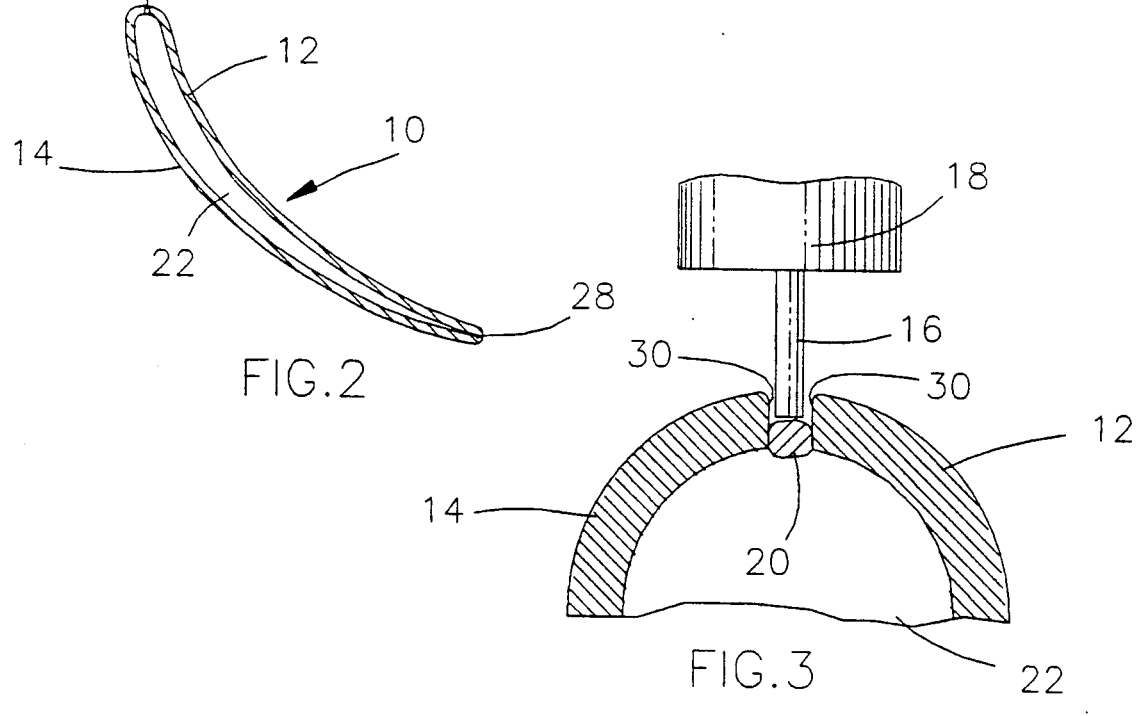
FIG. 2
FIG. 3

METHOD FOR JOINING SINGLE CRYSTAL TURBINE BLADE HALVES

This invention generally relates to gas turbine engine manufacturing techniques. In particular, this invention relates to a method for joining matched, single crystal turbine blade halves formed from high temperature nickel based superalloys, using an electrospark fusion welding process.

BACKGROUND OF THE INVENTION

Gas turbine engines are routinely used in modern day aircraft. In these jet propulsion systems, air is drawn in at the upstream end of the engine and the pressure, density and temperature of the air are raised by a compressor. Just downstream from the compressor, fuel is injected into the air and burned, adding energy to the gaseous fluid. The gaseous mixture then expands and passes through a gas turbine (which drives the compressor) on its way to the exit nozzle. There it emerges into the atmosphere at an extremely high velocity and at a pressure equal to or greater than the atmospheric pressure surrounding the nozzle. Lift and propulsion of the aircraft is thereby achieved.

Current turbine engines are characterized by demanding performance specifications over an incredibly wide variation in temperature. It is not unusual for the engine specifications to require performance at temperatures ranging from subzero up to about 2000° F. Therefore it is necessary that the manufacturing techniques used to form these engines allow very little room for deviation. In particular, the turbine blades which are used within these turbine engines are manufactured to precise specifications, having dimensional tolerances often within a few thousandths of an inch.

Generally, the turbine blades are characterized by a relatively complex shape, having a thin leading edge seam and a wider trailing edge seam. Internally, the turbine blade typically has at least one cavity for cooling purposes. These turbine blades are sometimes cast as a single unit, however in the more complex designs, the turbine blade is formed by joining two matched halves. The turbine blade, whether a single unit or two matched halves, is typically formed from a single crystal of a nickel based superalloy which is characterized by high strength at these demanding temperature extremes.

There have been many methods for joining the two single crystal, matched halves. A particularly common method has been to diffusion braze the two mating halves together. In diffusion brazing, a braze filler alloy is provided between the two base metal turbine blade halves in those regions where the two halves are to be joined. This is typically not only at the leading and trailing edges, but also at the root and tip portions of the blade, as well as the internal cavities within the blade. When heated to the brazing temperature, the braze alloy melts. The braze alloy contains a melting point suppresser, generally boron, which diffuses into the single crystal base metal during the brazing operation. Since the melting point suppresser has been diffused out of the braze filler alloy, the re-melt temperature of the braze alloy will correspondingly increase. Therefore, solidification of the braze alloy will occur at the brazing temperature as the braze alloy is depleted of boron. Brazing time and temperature are determined so that the re-melt temperature of the braze alloy (which has been depleted of its melting point suppresser) is the same as the melting point of the single crystal base metal.

A problem is encountered when edges of thin sections of the single crystal nickel based alloys are diffusion brazed together, such as in particular when the leading edges of the matched turbine blades are brazed together. Due to the sluggish rate at which the boron diffuses into the single crystal nickel alloy, high levels of boron exist both in the braze alloy within the joint region and in the surrounding diffusion zone of the base metal after brazing. Because the solutioning and melting point temperatures for the single crystal nickel alloys used for these turbine blades are extremely close, the post brazing solution heat treatment at the solutioning temperature for the single crystal nickel based alloy, may actually cause melting within those regions where high levels of boron exist, such as in the brazed joint and surrounding diffusion zone. This is particularly troublesome since melting may disrupt the single crystal structure of the turbine blade and correspondingly diminish its performance characteristics.

In addition, another problem exists with regard to the joining of these matched turbine blade halves. When proper edge alignment between the matched blade halves is not achieved correctly, an unfilled edge joint will remain after brazing. This may also occur with turbine blades which have a brazed on cover sheet for providing transpiration cooling of the blade. In either instance, if proper edge alignment can not be maintained during the joining process, an open seam will exist. This gap, particularly when at the leading edge of a turbine blade, will seriously effect the aerodynamic performance of the blade during operation.

Therefore, what is needed is a method for joining matched, single crystal turbine blade halves which alleviates the shortcomings of the current brazing methods, particularly when joining the thin wall sections of these halves such as at their leading edge. It would be desirable if such a method did not rely on diffusion brazing techniques, so as to alleviate the use of a melting point suppresser and accordingly eliminate the problem of post-brazing re-melt during solution heat treatment of the single crystal, nickel alloy, base metal. It would also be advantageous if such a method were capable of providing a metallurgically compatible material in the joined region as compared to the base metal. Still further, it would be desirable if such a method could completely and uniformly fill the joint between mating blade halves despite any misalignment between those halves.

SUMMARY OF THE INVENTION

It is, therefore, the principle object of this invention to provide a method for joining matched, single crystal, turbine blade halves, particularly at the thin sections of those halves, which utilizes a metallurgically compatible braze filler material that does not cause undesirable re-melt of the base metal during post-joining solution heat treatment.

It is a further object of this invention that such a method utilize electrodeposition techniques, particularly electrospark deposition techniques, to substantially eliminate any heat affected zone within the base metal.

It is still a further object of this invention that such a method permit complete and uniform filling of the joint region even though some misalignment between mating halves may exist.

In accordance with a preferred embodiment of this invention, these and other objects and advantages are accomplished as follows.

An electrospark method is provided for joining matched, turbine rotor blade halves formed from single crystals of a high temperature, nickel based superalloy. The matched blades are joined by fusion welding of a metallurgically compatible material, which in most instances is identical to the nickel based superalloy used in the mating halves.

Generally, two matched turbine blade halves are provided, each having faying surfaces along their leading and trailing edges which are to be joined to form a complete turbine blade. The blades may also have faying surfaces along any internal cooling cavities or along the root and tip sections of the halves. At least one of the blade halves is operably electrically connected to the negative lead of a rectified alternating current electrical power source.

An electrode formed from an appropriate material which is metallurgically compatible with the nickel based alloy is electrically connected in parallel to a capacitor charging circuit and positively connected to the AC source of electrical power. Preferably, the electrode material is the same as the base metal nickel based alloy.

The two blade halves are mated along their faying surfaces. The electrode is in close proximity to the mated faying surfaces and deposits metal to this region upon contact between the electrode and blade metal and concurrent discharge of the capacitor charging circuit. Upon discharge, the electrode material is transferred from the electrode to the weld region along the faying surfaces. The discharge of the capacitor is repeated as necessary along the weld region so as to completely join the two blade halves at their faying surfaces.

The discharged material is deposited onto, and concurrently metallurgically alloyed into, the desired joint region of the blade halves by transfer of the material from the electrode using a short duration electrical impulse. Although the spark that is generated by the discharge of the capacitor is of a short duration, it has sufficient energy to melt a portion of the electrode causing it to be accelerated through the arc formed between the negatively charged blade metal and the positively charged electrode, and to thereby be deposited onto the base metal. Upon contact, the deposited metal alloys with the substrate forming a fully dense metallurgical bond The time and energy involved are small enough that total heat input to the base metal is minimal so that distortion and metallurgical structure changes of the base metal are negligible. This is a particularly advantageous feature of this invention, since the single crystal structure of the blade halves must not be significantly impaired by the joining process in order to ensure satisfactory performance of the turbine blades over a wide temperature range.

With this method, there is great flexibility associated with the type of filler metal to be deposited and the blade metal used. An inventive feature of this method is that the blade halves are joined by utilizing a metallurgically compatible filler metal which is specifically applied to the desired joint regions, thereby eliminating the need for a braze alloy which contains a melting point suppresser. The filler metal will preferably have the same chemical composition as the blade metal. Remelting of either filler metal or blade metal at the joint location will not occur during the post solution heat treatment of the single crystal turbine blade. Therefore, the single crystal structure of the blade halves is retained. In addition, upon contact between the deposited filler alloy and the base metal, a permanent metallurgical bond is formed between the metals, with virtually no heat-affected zone being formed or distortion of the blade metal. Lastly, the electrode made from the filler alloy can be manipulated manually or mechanically, allowing for complete control over the deposition of the filler metal to the blade metal, thereby making joint fit-up between the faying surfaces less critical than with conventional methods.

Other objects and advantages of this invention will be better appreciated from the detailed description thereof, which follows.

BRIEF DESCRIPTION OF THE DRAWINGS

The above and other advantages of this invention will become more apparent from the following description taken in conjunction with the accompanying drawing wherein:

FIG. 1 is an elevated view showing the proximity of the matched turbine blade halves to the electrode formed from the filler metal, during deposition of the filler metal, in accordance with a preferred embodiment of this invention;

FIG. 2 is a cross-sectional view of an illustrative example of the type of turbine blade which is formed from two matched halves, and which is joined in accordance with a preferred method of this invention; and FIG. 3 is a cross-sectional view along line 3—3 of FIG. 1 showing the deposited filler metal which joins the matched turbine blade halves.

DETAILED DESCRIPTION OF THE INVENTION

We are the first to metallurgically join matched, turbine rotor blade halves formed from single crystals of a high temperature, nickel based superalloy, using an electrospark deposition technique. The matched blades are fusion welded using a metallurgically compatible material, which is preferably identical to the nickel based superalloy used in the mating halves.

As shown in FIG. 1, an electrode 16 formed from the desired weld filler alloy is retained within a holder 18, and electrically connected to the turbine blade 10 formed from the desired base metal, most preferably a single crystal nickel-based superalloy for performance at extreme elevated temperatures. The electrode 16 is charged positively and the turbine blade 10 is charged negatively for deposition of material.

As shown cross-sectionally in FIG. 2, two matched turbine blade halves 12 and 14 are provided which are each formed from a single crystal of the desired nickel based superalloy. Each blade half has faying surfaces along its leading and trailing edges, 28 and 30 respectively. When the blade halves are joined along these faying surfaces 28 and 30, a complete turbine blade 10 is formed. For clarity purposes, the turbine blade 10 is shown as having only one internal cooling cavity 22. In practice, the turbine blade 10 may have a complex cooling system with several internal cooling cavities. Thus, the blade halves 12 and 14 would also have faying surfaces along these internal cooling cavities as well, and possibly also along the root and tip sections of the blade halves 12 and 14 if necessary. The advantages associated with the method of this invention are most apparent though when joining the extremely thin portions of the blade halves 12 and 14, such as at their leading and trailing edges 28 and 30, since there is no heat-affected zone formed with this method to disrupt the single crystal structure of the underlying base metal. At least one of the blade halves 12 or 14, will be operably electrically connected to the negative lead of a rectified alternating current electrical power source.

The electrode 16 shown in FIG. 1 is formed from an appropriate weld filler material. As stated previously, it is preferred that the electrode 16 be formed from the same nickel based alloy used in the turbine blade halves 12 and 14 for maximization of the physical properties of the turbine blade 10 during performance. The electrode 16 is preferably electrically connected in parallel to a capacitor charging circuit and positively connected to the AC source of electrical power (not shown). Although other means for achieving the desired electrical circuitry may also be used.

As shown in FIG. 1, the two blade halves 12 and 14 are mated along their faying surfaces 28 and 30. As shown greatly exaggerated in FIG. 3, the electrode 16 is disposed in proximity to the mated faying surfaces (both shown as 30) where the weld is desired.

The weld filler alloy (depicted as region 20) is deposited onto, and alloyed into, the desired weld region at the faying surfaces 30 of the matched blade halves 12 and 14 by transfer of the filler metal from the electrode 16 using a short duration electrical impulse. A capacitor is conventionally charged using a rectified alternating current power source and then discharged through the electrode 16 by the firing of an independently triggered thyristor (not shown). As stated previously, alternate means for accomplishing the discharge of the capacitor are known in the art and may be used.

The spark that is generated by the discharge is of a short duration, yet it has sufficient energy to melt a portion of the filler metal electrode 16 causing it to be accelerated through the arc formed between the negatively charged blade half 12 or 14 and the positively charged electrode 16. Alternatively, the entire matched and assembled turbine blade 10 could be negatively charged, if this is more feasible in practice. The melted portion of the filler metal electrode 16 is thereby deposited at the weld region 20 between the faying surfaces 28 and 30 of the blade halves 12 and 14. Upon contact, the deposited filler metal 20 alloys with the turbine blade 10 base metal so as to form a fully dense metallurgical bond between the metals. The time and energy involved during the deposition process are relatively small, so that total heat input to the turbine blade 10 base metal is minimal. Therefore, distortion and metallurgical structure changes of the single crystal turbine blade 10 base metal are negligible. This is a particularly advantageous feature of this invention, since the single crystal structure of the blade halves 12 and 14 must not be significantly impaired by the joining process so as to ensure satisfactory performance over a wide temperature range.

Frequency rates varying between about 200 Hz to about 1200 Hz for the alternating current are used to generate the sparking, and corresponding melting, of the filler alloy electrode 16. It has been determined that this range of frequencies provides sufficient energy into the electrode 16 so as to melt the material, but also allows sufficient control over the material deposition rate.

Deposition of the filler alloy electrode 16 occurs as the electrode 16 contacts either matched turbine blade half 12 or 14, and the capacitive circuit is concurrently discharged. As stated previously, FIG. 3 is greatly magnified for purposes of discussing this invention, and shows the matched faying surfaces 30 at the trailing edge of the turbine blade 10, as well as a portion of the internal cooling cavity 22. In actuality, the distance between matched faying surfaces 30 would be extremely small. Therefore, the electrode 16 would appropriately contact either, and most probably both, blade halves 12 or 14. It is preferred that the surfaces 30 contact each other, however this is difficult to achieve along the entire length of the faying surface 30. The weld 20 is provided either between the faying surfaces 30 as shown (though not to scale), or if the matched faying surfaces 30 contact each other, the weld 20 is provided on the outer circumference of the faying surfaces 30. A relatively large distance is shown between the matched faying surfaces 30 to illustrate the advantages of this invention when a large gap is present. With conventional methods, these two surfaces (30) could not be satisfactorily joined, thereby a gap would remain and would result in diminished aerodynamic performance of the turbine blade 10.

The electrode 16 is provided within an appropriate holder 18 which is manually or mechanically moved along the desired weld region 20 along the faying surfaces 28 or 30, while the simultaneous and continual discharging of the capacitor occurs. With this method, weld filler alloy 20 is only deposited at the desired regions where contact is made between the electrode 16 and turbine blade 10 base metal. Therefore, this method facilitates the production of any desired length or configuration of weld joint 20 and is limited only by the accessibility of the electrode 16 to the weld region 20, thereby permitting great flexibility during assembly of the blade halves 12 and 14. It has been determined that deposition of the electrode material 16 occurs more smoothly if the electrode 16 is simultaneously oscillated or rotated while contacting the turbine blade halves 12 and 14. This prevents sticking of the electrode 16 to the turbine blade 10 base metal when the melted portion of the electrode 16 is deposited.

With this method, the layer of weld filler alloy 20 is metallurgically bonded to the turbine blade 10 base metal. The surface of the weld 20 is typically not smooth, as shown, due to the nature of this deposition process wherein the electrode 16 is moved along the length of the desired weld region. Individual fillets are formed each time the electrical circuit is discharged through the electrode 16 and the small amount of electrode material is melted. If a smooth weld 20 is required, the layer 20 can be appropriately machined or polished after deposition.

The blade halves 12 and 14 may be formed from any suitable high temperature material. Also, it is preferred that the material be capable of being cast into a single crystal for maximization of its strength and physical properties at the elevated temperatures. Examples of suitable materials are not only the iron and nickel base superalloys, but also cobalt base alloys, stainless steels, iron alloys, mechanical alloy materials, and titanium alloys. Our results have been directed to the use of various commercially available nickel based superalloys which are suitable for high temperature use, although it is expected that satisfactory results would be achieved with any of the above listed materials. Their commonly known material designation names and elemental compositions (in nominal weight percentages) are as follows:

CMSX-3: 7.8%Cr, 4.6%Co, 0.5%Mo, 8.0%W, 1.0%Ti, 6.0%Ta, 5.6%Al, 0.1%Hf and balance Ni, which is a commercially available, single crystal cast material; and AF56: 12.0%Cr, 9.0%Co, 2.0%Mo, 4.5%W, 4.3%Ti, 4.5%Ta, 3.3%Al, 0.002%B, 0.01%Zr, 0.25%Fe, 0.05%Va, 0.01%Hf and balance Ni, which is also a commercially available, single crystal cast material.

The weld filler alloy may be any electrically conductive material that can be formed into an electrode and that is metallurgically compatible with the single crystal nickel based metal to be welded. The weld filler alloy must be able to conduct and discharge the electrical charge of the capacitive charging circuit, which is used to melt the weld filler alloy electrode so as to deposit the weld filler alloy appropriately. Preferably though the weld filler alloy is the same material as the single crystal nickel base alloy used to form the turbine blade components. This preferred combination maximized the performance of the material (and accordingly the turbine blade itself) at the elevated temperatures. However, other metallurgically compatible materials could be used such as weld filler alloys formed from other nickel based alloys, as well as iron and cobalt based materials.

The weld filler alloy was successfully deposited onto matching components formed from each of the two single crystal nickel base superalloys using the electrospark deposition method of this invention. In each case, the weld filler alloy was identical to the single crystal, nickel base metal used; i.e., CMSX-3 material was used with CMSX-3 and AF56 material was used with AF56.

The welds formed with the applied weld filler alloy in accordance with this invention exhibited dense metallurgical bonds with no heat affected zones in the blade base metal. After appropriate heat treatment known in the art for each particular base-metal, the weld region had the same crystallographic microstructure as the blade base metal.

The preferred electrospark process parameters employed for both materials are as follows. As shown in FIG. 1, first, any internal ribs and thicker edges of the turbine blade halves 12 and 14, as well as the base 24 or root 26 sections of the blade 10 if necessary, should be conventionally diffusion brazed together. In addition, the thicker edges of the tip, leading and trailing edges of the blade halves 12 and 14 could be first diffusion brazed conventionally, before finishing the joining process with this method on those surfaces which are extremely thin where the resulting crystallographic microstructure is most critical. Preferably, the faying surfaces to be joined with this method are machined to form a radius of approximately 0.020" with a 60 degrees bevel from the centerline. This facilitates the acceptance of the weld filler alloy and the corresponding fusion welding of the materials.

Next the surfaces to be joined by this method are cleaned thoroughly, such as by grinding or machining to remove gross debris followed by grit blasting to remove any other foreign matter. The surfaces then should be wiped with acetone or any other traditional cleaning solvent.

The electrodes used to metallurgically weld the faying surfaces of the turbine blade halves are formed from either the CMSX-3 or AF56 depending on the base metal of the turbine blade halves. The electrodes are 0.086" in diameter and 2.0" long for the oscillating type of electrode holder, and 0.125" in diameter and 2.0" long for a rotating type of electrode holder. It is preferred for best control of the welding process that the tip of the electrode should not extend more than 1.25" from the electrode holder's chuck.

The single crystal, nickel based superalloy blade halves are then coated using this technique. Argon gas flows over the region to be welded at a rate sufficient to shield this region from unwanted oxidation or exposure to the atmosphere. In practice, the argon was flowed at about 10 cubic feet per hour, and the region to be joined was purged with the argon for about 30 seconds prior to coating to ensure good welding results. Any other commercially available inert gas could also be used to shield the region during the braze alloy deposition process. The electrode motion begins either oscillating or rotating, depending on the torch type holder, and the capacitor charged. The workpiece is touched with the electrode with a pressure equivalent to what would be used for coloring with a wax crayon. The electrode is then moved along the faying surfaces of the blade halves applying an even line of the weld filler alloy from the electrode arcing. Preferably, overlapping passes are made with the electrode until the entire surface is uniformly covered with the braze alloy. The electrode angle should be at about a 45 degree angle with the workpiece during the deposition process.

The capacitance value employed is about 20 microfarads and the frequency is about 200 Hz. A short circuit voltage of about 100 volts and a short circuit current of about 1 Ampere is used. These parameters may be varied within reasonable limitations, however these values resulted in high quality metallurgical welds. The particulars of the electrospark deposition method used are similar to the teachings of U.S. Pat. No. 4,405,851 to Sheldon entitled "Apparatus for Transfer of Metallic Materials by Electric Discharge".

In addition, it is foreseeable that one would want to use this method to join the leading edge of the two cooling sheet halves that are diffusion brazed to the turbine blade. The cooling sheets are perforated and are used to promote transpiration type cooling of the turbine blade. The diffusion brazed cooling sheets are also formed from the single crystal nickel based material and are extremely thin. Therefore, this method would be advantageous for joining the butting edges of the two connecting cooling sheet halves at the leading edge of the blade, if desired, for the same reasons as set forth above.

With this method, there is great flexibility associated with the type of filler metal to be deposited and the blade metal used. An advantage of this method is that the blade halves are joined by utilizing a metallurgically compatible filler metal which is specifically applied to the desired joint regions, thereby eliminating the need for a braze alloy which contains a melting point suppresser. The filler metal will preferably have the same chemical composition as the blade metal. In addition, upon contact between the filler alloy and the base metal, a permanent metallurgical bond is formed with virtually no heat-affected zone or distortion to the blade metal. Therefore, the single crystal structure of the blade halves is retained, even during the post-joining heat treatment. Lastly, the electrode made from the filler alloy can be manipulated manually or mechanically, allowing for complete control over the deposition of the filler metal to the blade metal, thereby making joint fit-up between the faying surfaces less critical than with conventional joining methods.

While our invention has been described in terms of preferred embodiments, it is apparent that other forms of this method could be adopted by one skilled in the art, such as by substituting other base metals or weld filler alloys, or by modifying the electrical circuitry or hook-up. Accordingly, the scope of our invention is to be limited only by the following claims.

The embodiments of this invention in which an exclusive property or privilege are claimed is as follows.

1. A method for joining single crystal turbine blade halves comprising the following steps:
   providing a first turbine blade half having a first faying surface and a second turbine blade half having a second faying surface, said first and said second blade halves are formed from a nickel based alloy oriented essentially along a single crystallographic plane and are matched so as to form a complete turbine blade when said first and said second faying surfaces are joined;
   providing an electrode formed from an appropriate material which is metallurgically compatible with said nickel based alloy;
   mating said first and said second turbine blade halves essentially along said first and said second faying surfaces so as to form a turbine blade assembly having a weld region along the length of said faying surfaces, said electrode being in proximity with said weld region;
   operably connecting positive and negative discharge leads to a capacitive charging circuit, said positive lead being directly connected to said electrode and said negative lead operably connected to said turbine blade assembly;
   discharging said capacitor within said capacitor charging circuit through said electrode upon contact between said electrode and said weld region of said turbine blade assembly, such that said electrode material is transferred from said electrode to said weld region; and
   repeating said discharging step as necessary within said weld region along said length of said faying surfaces so as to metallurgically join said first and said second turbine blade halves at said weld region.

2. A method for joining single crystal turbine blade halves as recited in claim 1 wherein said electrode is formed from said nickel based alloy used in said first and second turbine blade halves.

3. A method for joining single crystal turbine blade halves comprising the following steps:
   providing a first turbine blade half having a first faying surface and a second turbine blade half having a second faying surface, said first and said second blade halves are formed from a nickel based alloy oriented essentially along a single crystallographic plane and are matched so as to form a complete turbine blade when said first and said second faying surfaces are joined;
   providing an electrode formed from an appropriate material which is metallurgically compatible with said nickel based alloy and means for oscillating or rotating said electrode;
   mating said first and said second turbine blade halves essentially along said first and said second faying surfaces so as to form a turbine blade assembly having a weld region along the length of said faying surfaces, said electrode being in proximity with said weld region;
   operably connecting positive and negative discharge leads to a capacitive charging circuit, said positive lead being directly connected to said electrode and said negative lead operably connected to said turbine blade assembly;
   purging said weld region with an inert gas while contacting said weld region with said oscillating or rotating electrode and concurrently discharging said capacitor within said capacitor charging circuit through said electrode, such that said electrode material is transferred from said electrode to said weld region; and
   repeating said discharging step as necessary within said weld region along said length of said faying surfaces so as to metallurgically join said first and said second turbine blade halves at said weld region.

4. A method for joining single crystal turbine blade halves as recited in claim 3 wherein said electrode is formed from said nickel based alloy used in said first and second single crystal nickel based turbine blade halves.

5. A method for joining turbine blade halves
   a first turbine blade half having a first faying surface and a second turbine blade half having a second faying surface are provided, said first and said second blade halves are formed from a nickel based alloy oriented essentially along a single crystallographic plane and are matched so as to form a complete turbine blade when said first and said second faying surfaces are joined, wherein the improvement comprises;
   providing an electrode formed from said nickel based alloy;
   mating said first and said second turbine blade halves essentially along said first and said second faying surfaces so as to form a turbine blade assembly having a weld region along the length of said faying surfaces;
   operably connecting positive and negative discharge leads to a capacitive charging circuit, said electrode being positively connected in parallel to said capacitive charging circuit and said negative lead being operably connected to said turbine blade assembly;
   discharging said capacitor within said capacitor charging circuit through said electrode upon contact between said electrode and said weld region of said turbine blade assembly, such that said electrode material is transferred from said electrode to said weld region; and
   repeating said discharging step as necessary within said weld region along said length of said faying surfaces so as to metallurgically join said first and second turbine blade halves at said weld region.

6. A method for joining single crystal turbine blade halves as recited in claim 5 further comprising the steps of purging said weld region with an inert gas and oscillating or rotating said electrode, during said discharging step.

* * * * *